July 14, 1959

J. G. INGRES 2,894,490

DIFFERENTIAL FLUID PRESSURE MOTOR

Filed Nov. 27, 1953

INVENTOR
JEANNOT G. INGRES
BY *John H. Phillips*
ATTORNEY

July 14, 1959 J. G. INGRES 2,894,490
DIFFERENTIAL FLUID PRESSURE MOTOR
Filed Nov. 27, 1953 3 Sheets-Sheet 3
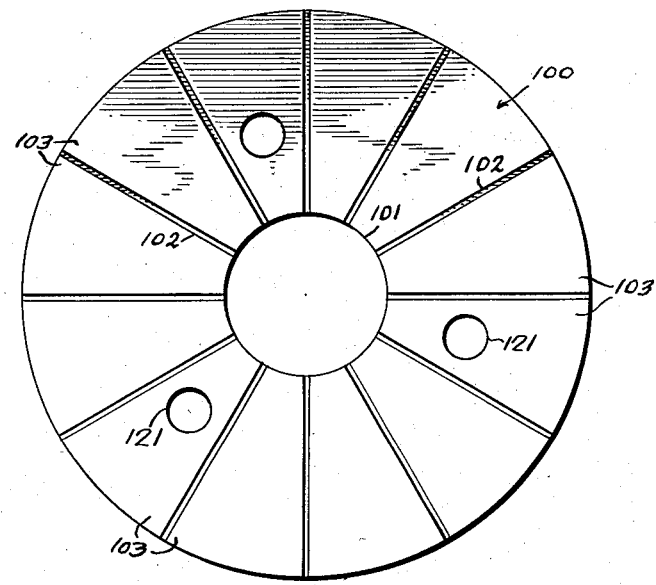
Fig-4-
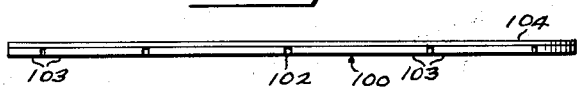
Fig-5-
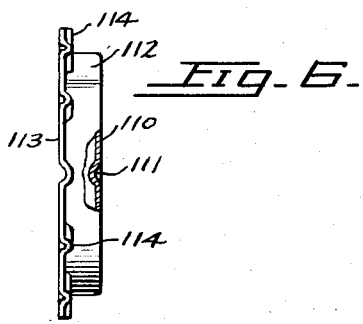
Fig-6-
INVENTOR
JEANNOT G. INGRES
BY *John V. Phillips*
ATTORNEY

United States Patent Office 2,894,490
Patented July 14, 1959

2,894,490
DIFFERENTIAL FLUID PRESSURE MOTOR

Jeannot G. Ingres, Dearborn, Mich., assignor to Kelsey-Hayes Company, a corporation of Delaware Application November 27, 1953, Serial No. 394,683

5 Claims. (Cl. 121—41)

This invention relates to a differential fluid pressure motor for motor vehicles.

In my copending application Serial No. 364,346, filed June 26, 1953, now Patent No. 2,790,306, I have disclosed and claimed a novel type of booster brake mechanism for motor vehicles wherein the pressure responsive unit of the booster motor comprises a pair of relatively floating units one of which is connected to a fluid displacing plunger extending into the master cylinder and the other of which is operated by differential pressures in the motor under the control of a follow-up valve mechanism. The two elements of the pressure responsive unit are connected by novel means, in the form of pivoted levers, for transmitting movement of the pressure responsive element of the unit to the element carrying the fluid displacing plunger, the connecting means including the levers serving the additional function of reacting against the pedal operated member which controls the operation of the follow-up valve mechanism.

Such prior construction involves numerous advantages over different earlier types of mechanisms. For example, a single fluid displacing plunger is employed while still providing means for accurate reacting against the brake pedal to provide the latter with "feel," without the provision of a pedal operated plunger cooperating with the power operated plunger. Moreover, such prior construction was advantageous in that it made it possible during a substantial portion of the operation of the device for relative movements of the valve mechanism to occur, for example to return to lap position during brake actuation, without transmitting movement to the hydraulic fluid displacing plunger.

An important object of the present invention is to improve the structure of the prior application referred to, by substituting therefor a novel type of lever means interposed between the two elements of the pressure responsive unit of the motor, the improved lever means eliminating the use of a plurality of levers formed of rigid material, together with the pivot pins necessary for supporting such levers for pivotal movement.

A further object is to provide such a construction wherein the lever means provides, in effect, a substantially greater number of levers to distribute forces circumferentially of the motor and wherein such lever means is simply and easily formed of a single sheet of material slotted radially to provide any desired number of lever elements which may be individually flexed to distribute reaction forces circumferentially around the axis of the motor and wherein no pivotal supporting means is required for such lever means.

A further object is to provide a construction of the character referred to which lends itself readily to the use of an axially slidable spool type valve by the provision of novel means which comes into operation, when needed, to prevent the chattering of the valve.

Other objects and advantages of the invention will become apparent in the course of the following description.

In the drawings I have shown one embodiment of the invention. In this showing:

Figure 4 is a face view of the lever plate;

Figure 5 is an edge elevation of the same; and

Figure 6 is an edge elevation of a cushion deforming ring.

Figure 1:
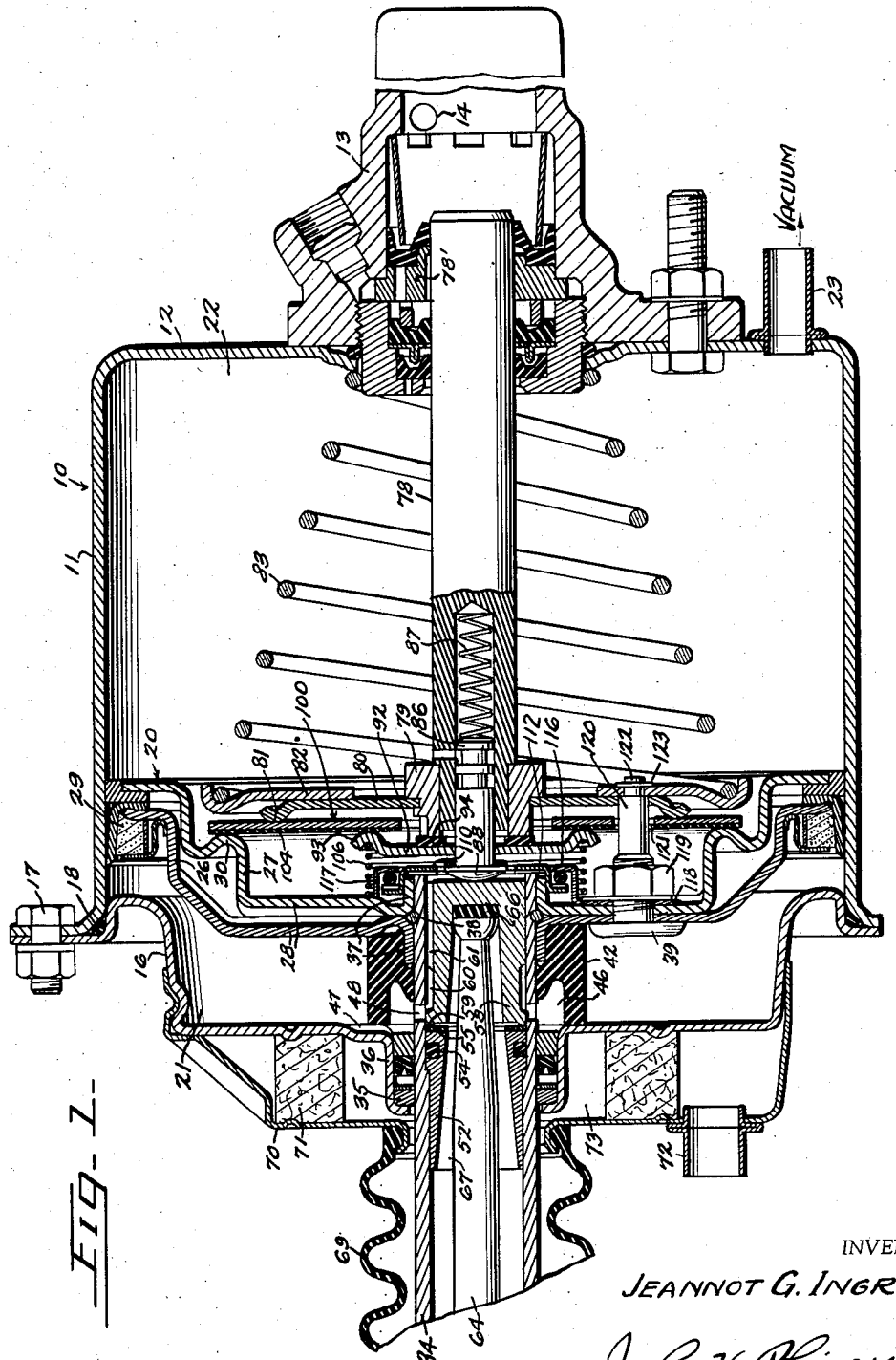
Figure 1 is an axial sectional view through the booster mechanism, parts being shown in section and parts being broken away, the motor parts being shown in their normal off positions.

Referring particularly to Figure 1, the numeral 10 designates a booster motor as a whole comprising a pressed cylinder 11 having an integral head 12 at one end to which is connected a now conventional master cylinder 13 having a lateral outlet opening 14 in which is arranged a conventional residual pressure valve (not shown). The opposite end of the motor is provided with a head 16 shown in the present instance as being a stamping, secured as at 17 to the cylinder 11 with an interposed sealing ring 18 to prevent leakage of air into the motor. A pressure responsive unit indicated as a whole by the numeral 20 is reciprocable in the cylinder 11 and divides the latter to form a variable pressure chamber 21 and a constant pressure chamber 22 having a nipple 23 by which the chamber 22 may be connected to a source of vacuum such as the intake manifold of a motor vehicle engine. Obviously, therefore, the motor of the present mechanism is intended to be vacuum operated, althrough the features of construction of the motor obviously are not limited to the use of such particular source of fluid pressure.

The pressure responsive unit 20 comprises a pair of body members 26 and 27 arranged in face-to-face relation in the manner shown in Figure 1 and preferably radially ribbed as at 28 to provide these members with a substantial degree of stiffness. At their outer peripheries, the members 26 and 27 carry a suitable cup structure 29 reciprocable in sealed relationship with the inner surface of the cylinder 11. The body member 27 is provided with an annular rib 30 for a purpose to be described.

An axial sleeve 34 is reciprocable in suitable sealing and bearing means 35 mounted within a hub 36 carried by the head 16. The body members 26 and 27 are provided at their radially inner extremities with oppositely extending flanges 37 fitting the sleeve 34 and fixed against longitudinal movement therealong by a snap ring 38. Bolts 39 (Figure 1), of which there are preferably three, fix the members 26 and 27 to each other. These bolts and the snap ring 38 form the sole means for connecting the members 26 and 27 to each other and fixing such members to the sleeve 34 to move as a unit therewith.

A rubber or similar bumper 42 surrounds the sleeve 34. One end of the bumper is engageable with the body member 26 and surrounds the flange 37 thereof, and the other end of the bumper is engageable with the adjacent head 16. The bumper 42 is provided with an internal chamber 46 in fixed communication with the motor chamber 21 through radial grooves 47 stamped in the head 16. The chamber 46 also communicates with the interior of the sleeve 34 through ports 48.

A valve seat sleeve 52 is arranged in the sleeve 34 and is shaped to engage against a shoulder 53 formed therein. The sleeve 52 is sealed relative to the sleeves 34 by an O-ring 54 and carries at one end a rubber or similar valve seat 55.

A valve mechanism controls the motor and comprises cooperating units, one of which is axially movable as described below. The specific valve mechanism shown, and described below is illustrative only.

A spool valve 58 is slidable in the sleeve 34 to the right of the seat 55 and is provided at one end with a valve element 59 engaging the seat 55 when the parts are in the off position shown in Figure 1. The valve 58 is provided with an annular groove 60, communicating with the ports 48 when the parts are in the off position, and such groove communicates with longitudinal grooves 61 formed in the periphery of the valve 58 and opening through the right-hand extremity of this valve to communicate with the motor chamber 22, as will become more apparent below.

An operating rod 64 extends into an axial recess 65 in the valve 58 and engages a cushion 66 in the bottom of such recess. The space 67 around the rod 64, within the sleeves 34 and 52, constitutes an air chamber which communicates with the ports 48 when the valve 58 is moved to the position shown in Figure 2.

The space 67 communicates with the interior of a boot 69 connected at its left-hand end to the rod 64 beyond the end of the sleeve 34 (not shown). The right-hand end of the boot 69 is connected to a cap 70 secured to the head 16 and housed therein is an annular air cleaner 71 to which air is supplied by a nipple 72. The space 73 within the air cleaner is in fixed communication through the boot 69 with the space 67. It will be apparent that when the parts are in the off position shown in Figure 1, the ports 48 are disconnected from the atmospheric space 67 and communicate with the motor chamber 22. Since the ports 48 are in fixed communication with the motor chamber 21, the pressure responsive unit 20 will be vacuum suspended.

Fluid displacing plunger 78 is movable into the master cylinder 13 and slides in suitable bearing and sealing means indicated as a whole by the numeral 78' and forming no part of the present invention. At its end opposite the master cylinder, the plunger 78 carries a hub 79 to which is connected a plate 80 having an annular rib 81 for a purpose to be described. Against the plate 80 is arranged another annular plate 82, and between the latter plate and the head 12 of the motor is arranged a conventional return spring 83.

An axially slidable plunger 86 is mounted in the left-hand end of the fluid displacing plunger 78 and is urged toward the left by a spring 87. The plunger 86 carries at its left-hand end a button 88 backed up by a cushion washer 89 for a purpose which will become apparent. The use of a member, comprising a button 88 and plunger 86, formed separately from the axially movable valve element 58, is desirable. It will become apparent, however, that the button is always in contact with the valve element 58 and accordingly may be considered to be a unit therewith, such unit being axially movable relative to the pressure responsive unit of the motor. Surrounding the plunger 86 is a plate 92 having formed at its outer periphery a rib 93 extending in the same direction as the rib 30 and in a direction opposite the rib 81. The plate 92 has bonded thereto a cushion washer 94, engageable with the adjacent end of the hub 79 for a purpose to be described. The button 88 provides the axially movable unit referred to, with a shoulder engageable by the plate 92 under conditions to be described.

The pressure responsive unit, as will be apparent from the foregoing description, constitutes a pair of relatively axially movable sections, one formed by the assembly comprising the members 26 and 27 and the elements associated therewith, and the other comprising the plates 80 and 82. One of the most important features of the present invention is the provision of lever means for transmitting forces from one of these sections to the other, and for reacting against the rod 64, connected to the conventional brake pedal (not shown). Such means in my prior application referred to comprises radially arranged levers pivotally supported by pivot pins carried by the section of the pressure responsive unit connected to the fluid displacing plunger which extends into the master cylinder. In such prior construction three of these levers were employed, and while fully operative and highly practicable, the forming and assembling of these levers was accomplished at appreciable cost. The present construction provides a highly improved and simplified form of lever means.

The improved lever means referred to comprises a "disk" indicated as a whole by the numeral 100 having a central opening 101 surrounding the hub 79. The "disk" 100 is formed of relatively stiff sheet steel and is radially slotted from the opening 101 to its outer periphery as at 102 to divide the "disk" 100 into a plurality of segments 103. These segments are bonded together by a layer of tough resilient material 104 formed, for example, from neoprene to fix the segments in position with respect to each other. In the making of the "disk" 100, a plate is employed having a diameter greater than that of the finished device. The body of the device is stamped and punched to provide the opening 101, and slots 102 terminate inwardly of the radial extremity of the body from which the device is made. The elastic layer 104 is then applied to and bonded with one side of the body, whereupon the solid portion of the body outwardly of the slots 102 is stamped off, leaving the independently movable segments 103 supported with respect to each other by the elastic layer 104. This assembly of parts therefore forms in effect an integral unit of simple construction, and it will become apparent that each of the segments 103 is adapted to operate as a separate lever to perform the functions of the levers shown in my copending application referred to.

Figure 2:
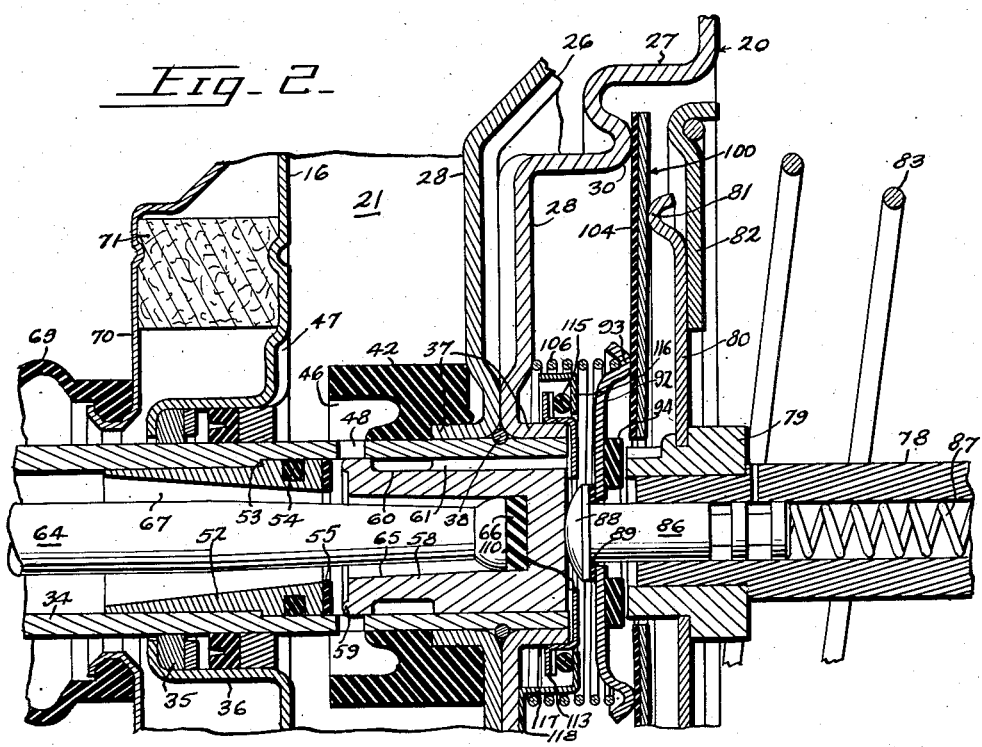
Figure 2 is a fragmentary sectional view of the same, the valve parts being shown in motor-energizing positions with the pressure responsive unit of the motor moved away from its normal off position.
Figure 3:
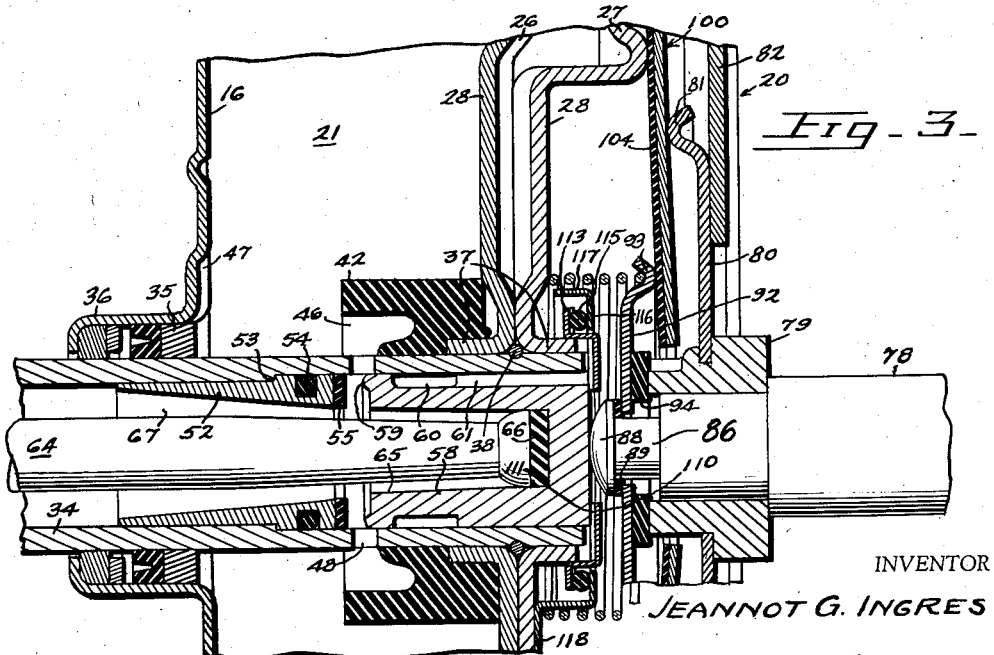
Figure 3 is a similar view showing the valve parts in fully open position with the pressure responsive unit moved to a brake applying position.

The "disk" 100 is arranged as shown in Figures 1, 2 and 3, the layer 104 contacting with the ribs 30 and 93 and the segments 103 contacting with the rib 81. A coil spring 106 is interposed between the rib 93 and the body member 27 to urge the plate 92 toward the right as viewed in Figures 1, 2 and 3. The return spring 83 urges the rib 81 to swing the inner ends of the segments 103 toward the left in opposition to the spring 106. The spring 83 is much stronger than the spring 106, but the lever length of each segment represented by the distance between ribs 81 and 93 is much longer than the lever length represented by the distance between ribs 30 and 81. Therefore the weaker spring 106, in the off positions of the parts, substantially balances the spring 83, and the segments 103, accordingly, lie substantially in a common plane perpendicular to the axis of the motor.

An annular stamping 110 is provided with an internal flange having ribs 111 seated against the right-hand end of the sleeve 34 as viewed in Figures 1, 2 and 3. This stamping is provided with an annular body 112 surrounding the adjacent flange 37, and inwardly of the extremity of such flange, the stamping is provided with an outstanding flange 113 (Figure 6) radially ribbed as at 114. These ribs engage a deformable resilient stabilizing ring 115 engaging a stamping 116 provided with an annular flange 117 arranged outwardly of the ring 115.

The stamping 116 (Figure 1), is provided at circumferentially spaced points, corresponding to the arrangement of the bolts 39, with radially outstanding ears 118 fixed in position by nuts 119 on the bolts 39. Beyond such nuts, each bolt 39 is provided with a shank 120 extending through an opening 121 in the lever unit 100, this opening being preferably slightly larger than the shank 120 for a purpose which will become apparent. Each shank 120 also extends through the plate 80 and is provided with a reduced end 122 extending through the plate 82, the latter being held in position on the bolt shanks by snap rings 123.

Operation

The parts normally occupy the positions shown in Figure 1. The motor chamber 22 is in constant communication with the source of vacuum through a pipe line connected to the nipple 23. The valve 58 will be in the position shown in Figure 1 with the valve element 59 engaging the seal 55, thus sealing the port 48 from the atmosphere. This port will be open through grooves 60 and 61 to the space at the right of the pressure movable unit, and accordingly the latter will be vacuum suspended.

When the brakes are to be applied, the operator will depress the brake pedal to move the rod 64 toward the right, carrying with it the spool valve 58, thus unseating the valve element 59 from the seal 55. Only slight movement of the valve is necessary to lap it relatively to the port 48, whereupon the motor chamber 21 will be disconnected from the opposite chamber 22. Slight further movement of the valve will admit air through port 48 into chamber 46, and thence into the motor chamber 21 to raise the pressure therein. Movement of the valve spool 58 to the point where it engages the ribs 111 (Figure 6) preferably cracks the ports 48 to the extent of approximately .006", which is all of the opening necessary for normal operation of the pressure responsive unit 20. This mere contact with the ribs 111 does not shift the member 110, the ribs 111 remaining in contact with the adjacent end of the sleeve 34. Accordingly, the cushion ring 115 will not be compressed.

At this point it should be noted that when the port 48 is cracked to the extent referred to, to the atmosphere, action of the spool valve 58 remains stable, and this element will move substantially as a unit with the sleeve 34 as differential pressure moves the unit 20 toward the right. If the valve 58 is initially moved at a more rapid speed, the port 48 may be opened as much as approximately .025". Under such conditions, the spool valve 58 is inclined to chatter. This is prevented with the present construction since such additional movement of the spool valve 58 toward the right shifts the member 110, causing the ribs 114 to deform the cushion ring 115, and the resiliency of this ring prevents the chattering action referred to.

In the off positions of the parts, the cushion ring 94 will have been engaged with the adjacent end of the hub 79, and the spring 87 will have maintained the head 88 in engagement with the adjacent end of the spool valve 58, with the cushion 89 beneath the head 88 slightly spaced from the plate 92. When the motor is initially energized, differential pressure moves the unit 20 toward the right, causing the rib 30 to exert pressure against the radially outer extremities of the segments 103. These segments fulcrum on the rib 81, and the inner ends of the segments exert a force to the left against the rib 93 to move the plate 92 toward the left to bring this plate into engagement with the cushion ring 89, as shown in Figure 2, this movement being very slight. In actual practice, this direct contact of the plate 92 with the cushion ring 89 does not occur until the plunger 78 encounters increased resistance to movement of fluid from the master cylinder to the extent necessary to move the brake shoes into engagement with the drums. At such point, increased hydraulic fluid pressure will occur, rendering the plate 80 more effective for resisting pressures exerted against the segments 103 by the ribs 30 and 93, and it is this resistance which causes the inner ends of the segments 103 to move the plate 92 into engagement with the cushion ring 89. This action takes place with the cushion ring 94 moved slightly out of engagement with the hub 79, as shown in Figure 2.

It will be apparent that prior to the point at which pressures are built up in the master cylinder incident to initial engagement of the brake shoes with the drum, movement is transmitted to the plunger 78 by pressure of the rib 30 against the segments 103 and pressure of these segments against the rib 81, the tilting of the segments 103 being prevented by the relatively light spring 106. This spring becomes ineffective for preventing the tilting of the segments 103 at the point at which the brake shoes engage the drums, the parts then assuming the positions shown in Figure 2. Beyond this point, and up to the point where the parts reach the positions shown in Figure 3, as described below, the rocking of the segments 103 transmits a force to the left to the plate 92, and this force is transmitted through the cushion ring 89 and head 88 to the valve 58 to oppose movement of the rod 64. In this period of the operation, therefore, the operator will feel through the brake pedal a resistance proportional to the degree of energization of the motor 10, the proportional resistance depending upon the ratio of the lever lengths of the segments 103 between the rib 30 and rib 81 and between the rib 81 and the rib 93.

As brake application continues, pressures in the master cylinder will progressively increase, whereas the force applied by energization of the motor 20 to the plunger 78 will reach a maximum point, known in the industry as the point of power "run-out." It is desirable, however, to provide for additional braking forces beyond this point, and this is accomplished by movement of the parts to the positions shown in Figure 3. After the point of power "run-out" has been reached, additional pressure exerted on the brake pedal will cause the valve 58 to move further to the right relative to the pressure responsive unit 20. This movement is transmitted through button 88 and cushion ring 89 to the plate 92 to move the cushion ring 94 into direct positive engagement with the hub 79, as shown in Figure 3. From this point up to the point of maximum brake application, the operator will be directly adding foot pressure to the power of the motor 10 to effect movement of the plunger 78 to displace fluid from the master cylinder 13 into the wheel cylinders.

In my copending application Serial No. 364,346, now Patent No. 2,790,306, referred to above, three rigid levers are connected to a plate corresponding to the plate 80 of the present construction, and the levers are connected to such plate by means of pivot pins. The present construction is superior to the earlier construction for several reasons. In the first place, the provision of the independently movable segments 103 makes for a high degree of simplicity, and the space required for these segments is less than required for the levers. It is not necessary to provide any pivots for the segments 103, and since, without additional expense, any number of segments may be employed, a high degree of uniformity in the application of pressures and reactions to and from the segments is provided.

The device is also advantageous over the prior construction in that it provides means (deformable ring 115) for positively preventing any chattering of the air valve incident to too rapid depression of the brake pedal. The cushion ring 115 does not function in the operation of the device at a normal rate of operation, but initial sudden and substantial movement of the brake pedal from normal position to open the valve element 59 to the extent which otherwise would cause chatter, will result in the deforming of the ring 115, the resiliency of which prevents the chattering of the valve.

The retractile movement of the parts will be obvious.

When the brake pedal is released, the spring 87, operating through stem 86 and head 88, will move the valve 58 back to its normal off position engaging the seal 55. The main return spring 83 of the motor will move the pressure responsive unit as a whole to off position, and the spring 106, acting against the plate 92, will return this plate to its normal position shown in Figure 1 with the cushion ring 94 engaging the hub 79 and with the plate 92 disengaged from the cushion ring 89.

The valve mechanism of course provides a perfect follow-up action of the pressure responsive unit relative to the brake pedal in both directions of movement of the pressure responsive unit. If the brake is applied to an intermediate extent, that is, to a point short of the point of power "run-out," and movement of the brake pedal is arrested, slight additional movement of the sleeve 34 will lap the port 48 relative to the valve and discontinue the admission of air into the chamber 21. Beyond the point of power "run-out," this operation cannot take place, since there is no additional power available for the motor. Under such conditions, the brakes simply will remain applied to the extent determined by pressure on the brake pedal.

Attention also is invited to the fact that if the pedal is depressed to apply the brakes to an intermediate extent as referred to above, the slight additional movement of the sleeve 34 necessary to lap the valve will not appreciably increase the reaction on the pedal, as occurs with most prior constructions. This is due to the fact that the body of the pressure responsive unit connected to the sleeve 34 is capable of slight additional movement most of which will be applied to the plunger 78, only a portion of the additional force reacting through the segments 103 to the valve 58. Accordingly, there will be no sudden increase in reaction when movement of the brake pedal is stopped.

It is to be understood that the form of the invention shown and described is for the purpose of illustration of a preferred embodiment of the invention, the scope of the invention being defined in the appended claims.

I claim:

1. A fluid motor comprising a casing having a pressure responsive unit therein, a force transmitting member in said motor, a member to be operated connected to said force transmitting member, a follow-up valve having fluid connection with the motor and with a source of pressure, said valve having a normal position disconnecting the motor from said source and being movable to connect the motor to said source to energize the motor, a reaction device in said motor having mechanical connection with said valve, and lever means comprising a plurality of segmental plates normally lying substantially in a common plane and rockably engaging at radially spaced points with said pressure responsive unit, said force transmitting member and said reaction device to transmit forces from said pressure responsive unit to said force transmitting member and to simultaneously react through said reaction device against said valve to oppose movement thereof away from its normal position, said reaction device comprising an axial head engaging said valve, said reaction device further comprising a reaction plate coaxial with said head and having lost motion connection therewith when said valve is in said normal position whereby said valve is initially movable from such position without transmitting any force to said reaction plate.

2. A fluid motor comprising a casing having a pressure responsive unit therein having a first annular contact surface, a force transmitting plate having a second annular contact surface of smaller diameter than said first-named contact surface, a member to be operated connected to said force transmitting plate, a follow-up valve having fluid connection with the motor and with a source of pressure, said valve having a normal position disconnecting the motor from said source and being movable to connect the motor to said source to energize the motor, a reaction device comprising a plate annularly ribbed to provide a third annular contact surface of smaller diameter than said second contact surface, a spring interposed between such plate and said pressure responsive unit, said reaction device further comprising a button biased into engagement with said valve and slightly spaced from said reaction plate when said valve is in said normal position whereby said valve is initially movable from such position free of said reaction device, and radial lever elements contacting all three of said contact surfaces whereby movement of said pressure responsive unit transmits a force to said force transmitting plate upon energization of said motor to move said member to be operated, and to react against said reaction device to oppose movement of said valve away from its normal position.

3. A fluid motor comprising a casing having a pressure responsive unit therein provided with a first annular contact surface, a force transmitting plate having a second annular contact surface of smaller diameter than said first contact surface, a member to be operated connected to said force transmitting plate, a follow-up valve mechanism for controlling said motor comprising a unit axially movable in said pressure responsive unit, said valve mechanism having a normal position disconnecting the motor from one source of pressure and being movable to connect the motor to a different source of pressure to energize the motor, a reaction device comprising a second plate having a third annular contact surface of smaller diameter than said second contact surface, radial lever elements contacting all three of said contact surfaces whereby movement of said pressure responsive unit transmits a force to said force transmitting plate upon energization of said motor to move said member to be operated and to react against said second plate in a direction opposite to movement of said member to be operated, and spring means biasing said second plate against said lever elements, said axially movable unit having a shoulder normally spaced from said second plate whereby said axially movable unit is initially movable from a normal position free of said second plate.

4. A fluid motor comprising a casing having a pressure responsive unit therein, a force transmitting member in said motor, a member to be operated connected to said force transmitting member, a follow-up valve mechanism having fluid connection with said motor and with a source of pressure, said valve mechanism having a normal position disconnecting the motor from said source and being movable to connect the motor to said source to energize the motor, a manually operable axially movable unit, said valve mechanism having elements carried respectively by said pressure responsive unit and said manually operable unit, said manually operable unit having a shoulder, a reaction device comprising an annular plate spaced from said shoulder when said valve mechanism is in said normal position, spring means between said member to be operated and said manually operable unit to bias the latter to a normal position, said pressure responsive unit having an annular shoulder and said plate having an annular shoulder smaller than the annular shoulder of said pressure responsive unit, both of said shoulders facing in the direction of movement of said pressure responsive unit when said motor is energized, said force transmitting member having an annular shoulder coaxial with and lying between and spaced from the annular shoulders of said pressure responsive unit and said plate whereby, when said motor is energized, the shoulder of said pressure responsive unit transmits forces to the shoulder of said force transmitting member and reacts against the shoulder of said plate to urge the latter in a direction away from the direction of movement of said pressure responsive unit, and spring means biasing said plate in the direction of movement of said pressure responsive unit to maintain said lever element in normal positions relative to said valve mechanism when the latter is in normal position, said plate in said normal positions of said valve mechanism and said levers being spaced from and arranged in the path of travel of said shoulder.

5. A motor according to claim 4 wherein said manually operable unit and said member to be operated comprise a pair of coaxial units in end-to-end relation, one unit of said pair having an axial recess, and a compression spring arranged in said recess and engaging the other unit of said pair.

References Cited in the file of this patent

UNITED STATES PATENTS

| | | |
|---|---|---|
| 1,620,513 | Bragg et al. | Mar. 8, 1927 |
| 2,275,697 | Stelzer | Mar. 10, 1942 |
| 2,457,721 | Price | Dec. 28, 1948 |
| 2,646,665 | Rockwell | July 28, 1953 |
| 2,685,170 | Price | Aug. 3, 1954 |
| 2,763,989 | Ayers | Sept. 25, 1956 |